Patented Jan. 29, 1929.

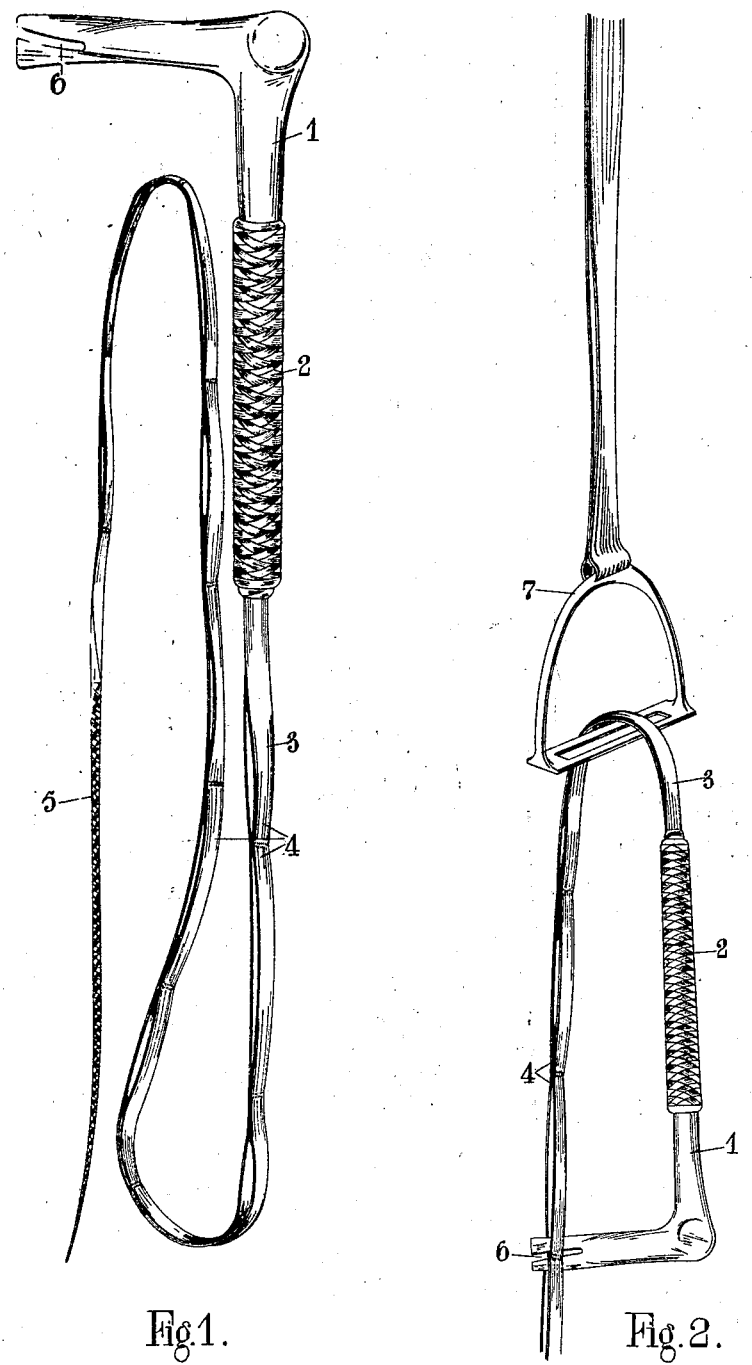

1,700,713

UNITED STATES PATENT OFFICE.

RALPH ROBERTS, OF LONDON, ENGLAND.

HARNESS.

Application filed July 7, 1928, Serial No. 291,057, and in Great Britain July 25, 1927.

This invention relates to devices for facilitating the mounting of a riding horse or other animal, said animal being furnished in the normal manner with a saddle, stirrups and the usual accessories.

It has for its object the provision of a temporary auxiliary means for mounting the animal, said means being particularly light, portable and unobtrusive.

The act of mounting a horse, particularly if the horse be of a restive disposition and the rider is of short stature, is frequently a matter of considerable difficulty. Many devices, such as mounting blocks and stools, are known for overcoming this difficulty but have the disadvantage that they are not readily portable in an unobtrusive manner.

Such devices are therefore confined to particular locations and are not available at all times. Moreover, a restive horse presents difficulties even in such cases.

The present invention consists in a hunting crop or whip characterized by the feature that the flexible part of the whip is adapted to be passed through the stirrup and connected in an easily detachable manner to the handle of the whip.

Such a device is easily portable, is readily detached from the stirrup when the rider is mounted and serves a dual purpose.

The invention may be carried into effect in the following manner by way of example as hereinafter described with reference to the accompanying drawings whereof:—

Figure 1 is an illustration of the whip and Figure 2 the whip in position as an auxiliary stirrup for mounting purposes.

According to the drawings a light L-shaped handle 1, preferably of metal, is attached firmly by means of plaiting or the like 2 to a flexible leather portion 3 formed as a series of loops 4 terminating in a thinner portion or lash 5. A suitably shaped slot 6 is formed in the free extremity of the handle into which any one of the loops 4 of the flexible portion 5 may be placed according to the length of auxiliary stirrup required.

The flexible portion 3 may be formed by fastening together a parallel pair of straps at intervals as shown.

In operation the flexible part of the device is passed through the ordinary riding stirrup 7 and a suitable loop fastened to the handle portion. When the rider is in the saddle a slight pull on the lash portion will detach the fastening and allow the whip to be freed from the stirrup and retained by the rider.

Having now described my invention, what I claim as new and desire to secure by Letters Patent is:—

1. A hunting crop or whip including means for connecting the flexible part of the whip in an easily detachable manner to the handle of the whip.

2. A crop or whip as claimed in claim 1, wherein the said means are constituted partly by a suitably placed slot in the handle portion and a loop in the flexible portion of the whip.

3. A hunting crop or whip as claimed in claim 1, wherein the said flexible portion comprises a pair of straps fastened together at intervals to form loops and terminates at one end in a plaited portion attached to the handle while the other end terminates in a lash.

In testimony whereof I have signed my name to this specification.

RALPH ROBERTS.